United States Patent
Zhu et al.

(10) Patent No.: US 11,191,046 B2
(45) Date of Patent: Nov. 30, 2021

(54) CONFIGURING SYNCHRONIZATION SIGNAL BLOCKS HAVING DIFFERENT POWER LEVELS

(71) Applicant: Motorola Mobility LLC, Chicago, IL (US)

(72) Inventors: Chenxi Zhu, Beijing (CN); Zhennian Sun, Beijing (CN); Hongmei Liu, Beijing (CN); Lianhai Wu, Beijing (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 16/623,119

(22) PCT Filed: Jun. 16, 2017

(86) PCT No.: PCT/CN2017/088656
§ 371 (c)(1),
(2) Date: Dec. 16, 2019

(87) PCT Pub. No.: WO2018/227554
PCT Pub. Date: Dec. 20, 2018

(65) Prior Publication Data
US 2020/0221401 A1 Jul. 9, 2020

(51) Int. Cl.
*H04W 56/00* (2009.01)
*H04W 76/27* (2018.01)
(Continued)

(52) U.S. Cl.
CPC ......... *H04W 56/001* (2013.01); *H04W 52/36* (2013.01); *H04W 72/046* (2013.01); *H04W 76/27* (2018.02)

(58) Field of Classification Search
CPC ............ H04W 52/143; H04W 52/247; H04W 52/322; H04W 52/36; H04W 52/00;
(Continued)

(56) References Cited

U.S. PATENT DOCUMENTS 10,979,128 B1 * 4/2021 Babaei ............ H04W 74/0816
2007/0066329 A1 * 3/2007 Laroia .................. H04W 56/00
455/502
(Continued)

FOREIGN PATENT DOCUMENTS

CN 102255689 A 11/2011
CN 106688288 A 5/2017

OTHER PUBLICATIONS

PCT/CN2017/088656, Notification of Transmittal of the International Search Report and the Written Opinion of the International Searching Authority, or the Declaration, dated Jan. 24, 2018, pp. 1-11.
(Continued)

*Primary Examiner* — Mewale A Ambaye
(74) *Attorney, Agent, or Firm* — Kunzler Bean & Adamson

(57) ABSTRACT

Apparatuses, methods, and systems are disclosed for synchronization signal block reception and synchronization signal block transmission. One apparatus (200) for synchronization signal block reception includes a receiver (212) that receives (402) multiple synchronization signal blocks. The multiple synchronization signal blocks have different power levels corresponding to at least two synchronization signal blocks of the multiple synchronization signal blocks.

19 Claims, 5 Drawing Sheets

(51) Int. Cl.
*H04W 52/36* (2009.01)
*H04W 72/04* (2009.01)

(58) Field of Classification Search
CPC . H04W 72/046; H04W 56/001; H04W 76/27; H04W 56/00; H04W 56/0025; H04W 76/00; H04W 76/10; H04W 40/08; H04W 52/0235; H04W 16/28; H04L 1/06; H04L 5/0048; H04B 17/24; H04B 7/0617
See application file for complete search history.

(56) References Cited

U.S. PATENT DOCUMENTS

| | | | |
|---|---|---|---|
| 2013/0010835 A1 | 1/2013 | Kanterakis et al. | |
| 2016/0192376 A1* | 6/2016 | Lee | H04W 72/0406 370/252 |
| 2016/0302230 A1* | 10/2016 | Novlan | H04L 27/0006 |
| 2018/0091249 A1* | 3/2018 | Han | H04L 27/2692 |
| 2018/0324631 A1* | 11/2018 | Jheng | H04L 1/1887 |
| 2018/0368081 A1* | 12/2018 | Akkarakaran | H04W 52/242 |
| 2019/0059058 A1* | 2/2019 | Chen | H04W 52/146 |
| 2019/0190582 A1* | 6/2019 | Guo | H04B 7/0695 |
| 2019/0200249 A1* | 6/2019 | Yoon | H04L 5/0023 |
| 2019/0215897 A1* | 7/2019 | Babaei | H04W 76/28 |

OTHER PUBLICATIONS

Ericsson, "Codeword to layer mapping for DL and UL", 3GPP TSG-RAN WG1 #88bis R1-1705883, Apr. 3-7, 2017, pp. 1-5.

Qualcomm Incorporated, "CW to layer mapping and frequency domain interleaving", 3GPP TSG RAN WG1 #88bis R1-1705574, Apr. 3-7, 2017, pp. 1-16.

3GPP, "3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, Mar. 2017, pp. 1-194.

3GPP, "3rd Generation Partnership Project; Technical Specification Group Radio Access Network; Evolved Universal Terrestrial Radio Access (E-UTRA); Physical layer; Measurements (Release 14)", 3GPP TS 36.214 V14.2.0, Mar. 2017, pp. 1-22.

3GPP, "3rd Generation Partnership Project; Technical Specification Group Radio Access Network; Study on Scenarios and Requirements for Next Generation Access Technologies; (Release 14)", 3GPP TR 38.913 V14.2.0, Mar. 2017, pp. 1-38.

* cited by examiner

CONFIGURING SYNCHRONIZATION SIGNAL BLOCKS HAVING DIFFERENT POWER LEVELS

FIELD

The subject matter disclosed herein relates generally to wireless communications and more particularly relates to synchronization signal block transmission.

BACKGROUND

The following abbreviations are herewith defined, at least some of which are referred to within the following description: Third Generation Partnership Project ("3GPP"), Positive-Acknowledgment ("ACK"), Binary Phase Shift Keying ("BPSK"), Clear Channel Assessment ("CCA"), Cyclic Prefix ("CP"), Cyclical Redundancy Check ("CRC"), Channel State Information ("CSI"), Common Search Space ("CSS"), Discrete Fourier Transform Spread ("DFTS"), Downlink Control Information ("DCI"), Downlink ("DL"), Downlink Pilot Time Slot ("DwPTS"), Enhanced Clear Channel Assessment ("eCCA"), Enhanced Mobile Broadband ("eMBB"), Evolved Node B ("eNB"), European Telecommunications Standards Institute ("ETSI"), Frame Based Equipment ("FBE"), Frequency Division Duplex ("FDD"), Frequency Division Multiple Access ("FDMA"), Guard Period ("GP"), Hybrid Automatic Repeat Request ("HARQ"), Internet-of-Things ("IoT"), Licensed Assisted Access ("LAA"), Load Based Equipment ("LBE"), Listen-Before-Talk ("LBT"), Long Term Evolution ("LTE"), Multiple Access ("MA"), Modulation Coding Scheme ("MCS"), Machine Type Communication ("MTC"), Multiple Input Multiple Output ("MIMO"), Multi User Shared Access ("MUSA"), Narrowband ("NB"), Negative-Acknowledgment ("NACK") or ("NAK"), Next Generation Node B ("gNB"), Non-Orthogonal Multiple Access ("NOMA"), Orthogonal Frequency Division Multiplexing ("OFDM"), Primary Cell ("PCell"), Physical Broadcast Channel ("PBCH"), Physical Downlink Control Channel ("PDCCH"), Physical Downlink Shared Channel ("PDSCH"), Pattern Division Multiple Access ("PDMA"), Physical Hybrid ARQ Indicator Channel ("PHICH"), Physical Random Access Channel ("PRACH"), Physical Resource Block ("PRB"), Physical Uplink Control Channel ("PUCCH"), Physical Uplink Shared Channel ("PUSCH"), Quality of Service ("QoS"), Quadrature Phase Shift Keying ("QPSK"), Radio Resource Control ("RRC"), Random Access Procedure ("RACH"), Random Access Response ("RAR"), Radio Network Temporary Identifier ("RNTI"), Reference Signal ("RS"), Resource Spread Multiple Access ("RSMA"), Round Trip Time ("RTT"), Receive ("RX"), Sparse Code Multiple Access ("SCMA"), Scheduling Request ("SR"), Single Carrier Frequency Division Multiple Access ("SC-FDMA"), Secondary Cell ("SCell"), Shared Channel ("SCH"), Signal-to-Interference-Plus-Noise Ratio ("SINR"), System Information Block ("SIB"), Transport Block ("TB"), Transport Block Size ("TBS"), Time-Division Duplex ("TDD"), Time Division Multiplex ("TDM"), Transmission Time Interval ("TTI"), Transmit ("TX"), Uplink Control Information ("UCI"), User Entity/Equipment (Mobile Terminal) ("UE"), Uplink ("UL"), Universal Mobile Telecommunications System ("UMTS"), Uplink Pilot Time Slot ("UpPTS"), Ultra-reliability and Low-latency Communications ("URLLC"), and Worldwide Interoperability for Microwave Access ("WiMAX"). As used herein, "HARQ-ACK" may represent collectively the Positive Acknowledge ("ACK") and the Negative Acknowledge ("NACK"). ACK means that a TB is correctly received while NACK (or NAK) means a TB is erroneously received.

In certain wireless communications networks, multiple transmission beams may be used. In such configurations, coverage of the multiple transmission beams from different cells may overlap.

BRIEF SUMMARY

Apparatuses for synchronization signal block reception are disclosed. Methods and systems also perform the functions of the apparatus. In one embodiment, the apparatus includes a receiver that receives multiple synchronization signal blocks having different power levels.

In one embodiment, the receiver receives power information corresponding to the power levels of the multiple synchronization signal blocks in radio resource control signaling. In a further embodiment, the apparatus includes a processor that determines a normalized reference signal received power corresponding to each synchronization signal block of the multiple synchronization signal blocks using the power information. In certain embodiments, the processor compares the normalized reference signal received power corresponding to each synchronization signal block of the multiple synchronization signal blocks. In various embodiments, the apparatus includes a transmitter that transmits feedback corresponding to the comparison of the normalized reference signal received power corresponding to each synchronization signal block of the multiple synchronization signal blocks. In some embodiments, the receiver receives nominal power information corresponding to the power levels of the multiple synchronization signal blocks in system information blocks.

In certain embodiments, the receiver receives power offset information corresponding to the power levels of the multiple synchronization signal blocks in system information blocks, radio resource control signaling, or some combination thereof. In some embodiments, the receiver receives power information corresponding to channel state information reference signals in radio resource control signaling. In various embodiments, the power information includes nominal power information, power offset information, or some combination thereof.

In one embodiment, the apparatus includes a processor that determines a normalized reference signal received power corresponding to channel state information reference signals using the power information. In certain embodiments, the receiver receives channel state information reference signal ports within a channel state information reference signal resource at a same transmission power level. In some embodiments, the receiver receives different channel state information reference signal resources at different transmission power levels. In various embodiments, the receiver receives power information corresponding to channel state information reference signal resources in radio resource control signaling. In one embodiment, the power information includes nominal power information, power offset information, or some combination thereof.

A method for synchronization signal block reception, in one embodiment, includes receiving multiple synchronization signal blocks having different power levels.

In one embodiment, an apparatus for synchronization signal block transmission includes a processor that determines power levels corresponding to each synchronization signal block of multiple synchronization signal blocks transmitted using multiple transmit beams. In some embodiments, the apparatus includes a transmitter that transmits the multiple synchronization signal blocks based on the power levels using the multiple transmit beams.

In certain embodiments, the transmitter transmits power information corresponding to the power levels of the multiple synchronization signal blocks in radio resource control signaling. In various embodiments, the transmitter transmits nominal power information corresponding to the power levels of the multiple synchronization signal blocks in system information blocks. In some embodiments, the transmitter transmits power offset information corresponding to the power levels of the multiple synchronization signal blocks in system information blocks, radio resource control signaling, or some combination thereof.

In certain embodiments, the transmitter transmits power information corresponding to channel state information reference signals in radio resource control signaling. In some embodiments, the power information includes nominal power information, power offset information, or some combination thereof. In various embodiments, the transmitter transmits channel state information reference signal ports within a channel state information reference signal resource at a same transmission power level. In one embodiment, the transmitter transmits different channel state information reference signal resources at different transmission power levels. In certain embodiments, the transmitter transmits power information corresponding to channel state information reference signal resources in radio resource control signaling. In various embodiments, the power information includes nominal power information, power offset information, or some combination thereof.

A method for synchronization signal block transmission, in one embodiment, includes determining power levels corresponding to each synchronization signal block of multiple synchronization signal blocks transmitted using multiple transmit beams. In some embodiments, the method includes transmitting the multiple synchronization signal blocks based on the power levels using the multiple transmit beams.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
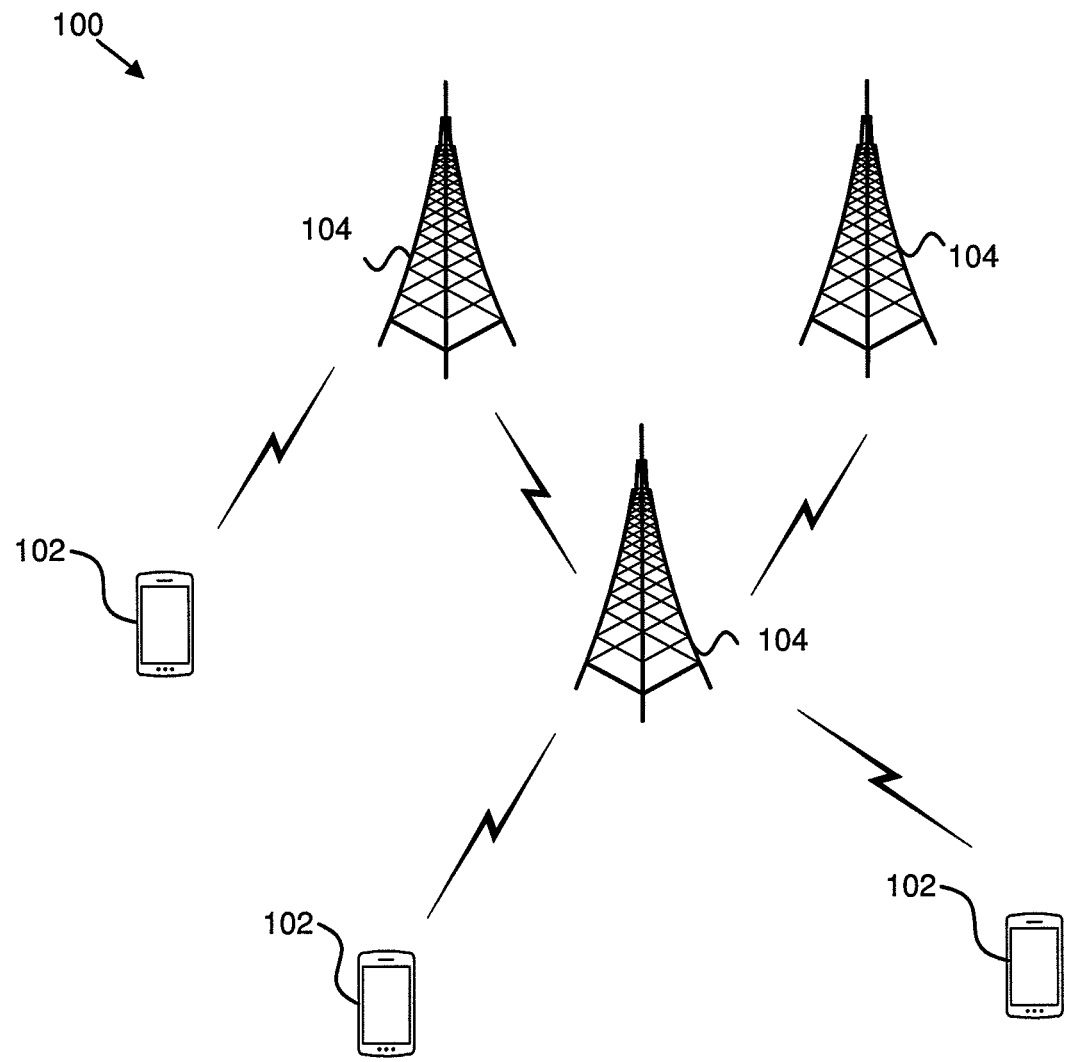
FIG. 1 is a schematic block diagram illustrating one embodiment of a wireless communication system for synchronization signal block transmission and/or reception.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for synchronization signal block transmission and/or reception. In one embodiment, the wireless communication system 100 includes remote units 102 and base units 104. Even though a specific number of remote units 102 and base units 104 are depicted in FIG. 1, one of skill in the art will recognize that any number of remote units 102 and base units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with the 3GPP protocol, wherein the base unit 104 transmits using an OFDM modulation scheme on the DL and the remote units 102 transmit on the UL using a SC-FDMA scheme or an OFDM scheme. More generally, however, the wireless communication system 100 may implement some other open or proprietary communication protocol, for example, WiMAX, among other protocols. The present disclosure is not intended to be limited to the implementation of any particular wireless communication system architecture or protocol.

The base units 104 may serve a number of remote units 102 within a serving area, for example, a cell or a cell sector via a wireless communication link. The base units 104 transmit DL communication signals to serve the remote units 102 in the time, frequency, and/or spatial domain.

In one embodiment, a remote unit 102 may receive multiple synchronization signal blocks having different power levels (e.g., at least two synchronization signal blocks have different power levels). Accordingly, a remote unit 102 may be used for synchronization signal block reception.

In certain embodiments, a base unit 104 may determine power levels corresponding to each synchronization signal block of multiple synchronization signal blocks transmitted using multiple transmit beams. In some embodiments, the base unit 104 may transmit the multiple synchronization signal blocks based on the power levels using the multiple transmit beams. Accordingly, a base unit 104 may be used for synchronization signal block transmission.

Figure 2:
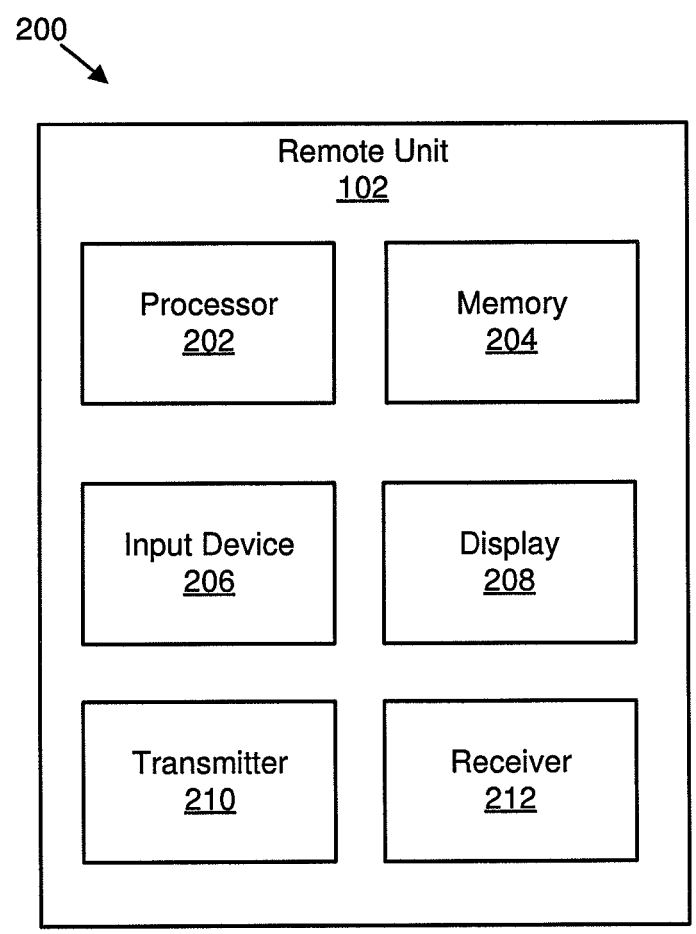
FIG. 2 is a schematic block diagram illustrating one embodiment of an apparatus that may be used for synchronization signal block reception.

FIG. 2 depicts one embodiment of an apparatus 200 that may be used for synchronization signal block reception. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to synchronization signal blocks. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In some embodiments, the receiver 212 may receive multiple synchronization signal blocks having different power levels. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
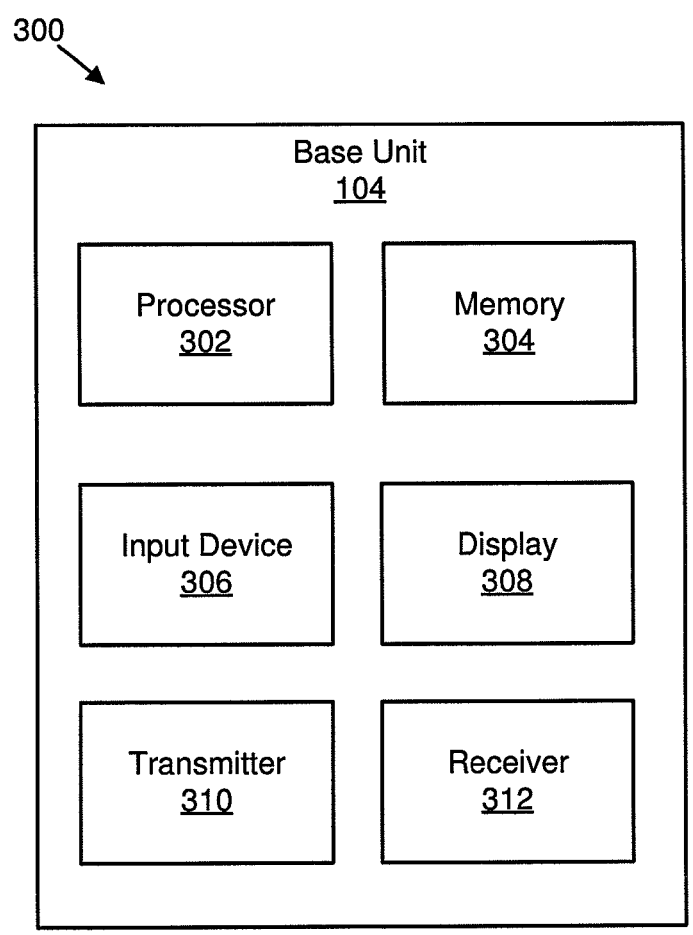
FIG. 3 is a schematic block diagram illustrating one embodiment of an apparatus that may be used for synchronization signal block transmission.

FIG. 3 depicts one embodiment of an apparatus 300 that may be used for synchronization signal block transmission. The apparatus 300 includes one embodiment of the base unit 104. Furthermore, the base unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In some embodiments, the processor 302 may be used to determine power levels corresponding to each synchronization signal block of multiple synchronization signal blocks transmitted using multiple transmit beams. In some embodiments, the transmitter 310 may be used to transmit the multiple synchronization signal blocks based on the power levels using the multiple transmit beams. Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

In certain embodiments, in response to the powers of synchronization signal blocks ("SS-blocks") transmitted through different TX beams being variable, the base unit 104 may control the size and shape of the coverage area by changing the SS-block transmission power. In such embodiments, by controlling the SS-block transmission power, as well as the TX beamforming vectors (direction and shape of the TX beams), the base unit 104 may optimize the overall network coverage and network capacity to a desired cell coverage area resulting in less interference and fewer coverage holes. Accordingly, functions such as fractional frequency reuse or coverage enhancement may be implemented more precisely and more optimally by the base unit 104.

In various embodiments, for remote units 102 in a connected state (e.g., RRC CONNECTED), because the remote units 102 may conduct more detailed measurements based on CSI-RS (in addition to SS-block measurement) and report the measurement results to a base unit 104, the base unit 104 may have more detailed information regarding their channel status and may better direct a remote unit 102 to handover to a cell, or a particular beam. In certain embodiments, variable power of the SS-block through different DL TX beams may be more useful to optimize a remote unit 102 in an idle state than a remote unit 102 in a connected state.

In some embodiments, a base unit 104 may control the individual power levels of SS-blocks transmitted through different TX beams. In various embodiments, besides being used for mobility measurement, SS-blocks may also be used for beam management by remote units 102 in a connected state. For example, because SS-blocks may be transmitted in cell-specific manner, they may be used for various steps of a DL beam management process.

In certain embodiments, for remote units 102 in a connected state, the remote units 102 may have selected (or have been handed over) to a best cell, so cell selection may not be an issue. In one embodiment, beam management may use a remote unit 102 to measure reference signal received power ("RSRP") of SS-blocks based on new radio ("NR") secondary synchronization signal ("SSS") (and possibly as well as demodulation reference signal ("DMRS") of PBCH) and report selected beams to the base unit 104. In some embodiments, the remote unit 102 may choose a subset of beams based on a measured SS-block RSRP and report the information to the base unit 104. In various embodiments, in response to the SS-blocks being transmitted through different DL TX beams having different TX power, a remote unit 102 in a connected state may need to know the power value (or power offset) of different SS-blocks in order to compare their RSRPs. Accordingly, in some embodiments, the base unit 104 may include power value (or equivalently power offset values) of the SS-blocks in RRC signaling when configuring an SS-block for a remote unit 102 in a connected state.

In certain embodiments, nominal power of SS-blocks may be signaled in SIB. Further, in various embodiments, power offsets of individual SS-blocks may be signaled either in SIB message or RRC signaling. In some embodiments, in response to the SS-block transmission power being known, a remote unit 102 may calculate and compare normalized RSRP for the SS-blocks. In one embodiment, normalized RSRP may be defined as a measured RSRP normalized with respect to power offset of the SS-blocks (as if the power offset is 0 dB for all the SS-blocks).

In certain embodiments, normalized SS-block RSRP power may be defined with respect to SS-block transmission power offsets. In such embodiments, a remote unit 102 may use normalized SS-block RSRP to compare, select, and provide feedback corresponding to SS-blocks to a base unit 104 for beam management.

In various embodiments, besides SS-blocks, CSI-RS may also be used for DL beam management. In such embodiments, in response to both SS-blocks and CSI-RS being configured for remote unit 102 beam management, the RSRP of an SS-block may be compared with the RSRP of a CSI-RS port in order to select and provide feedback for a number of good beams out of all configured (SS-block and CSI-RS) beams. In certain embodiments, the remote unit 102 may know the transmission power of CSI-RS as well as the transmission power of SS-blocks.

In some embodiments, a same transmission power may be used to transmit all the CSI-RS ports within a CSI-RS resource, while different CSI-RS resources may be transmitted with different TX power levels. In various embodiments, the TX power or power offset of a CSI-RS resource may be signaled by a base unit 104 to a remote unit 102 in a connected state through RRC signaling in response to CSI-RS resources being configured. In certain embodiments, CSI-RS power (nominal power and offset for individual CSI-RS resources) may be configured by RRC signaling. In one embodiment, similar to SS-blocks, normalized RSRP may be defined for CSI-RS for a remote unit 102 to compare the beams between CSI-RS in different CSI-RS resources or between CSI-RS and SS-blocks.

In various embodiments, normalized CSI-RS RSRP power may be defined with respect to SS-block transmission power offsets. In such embodiments, a remote unit 102 may use normalized SS-block RSRP to compare, select, and/or provide feedback CSI-RS RSRP to a base unit 104 for beam management.

Figure 4:
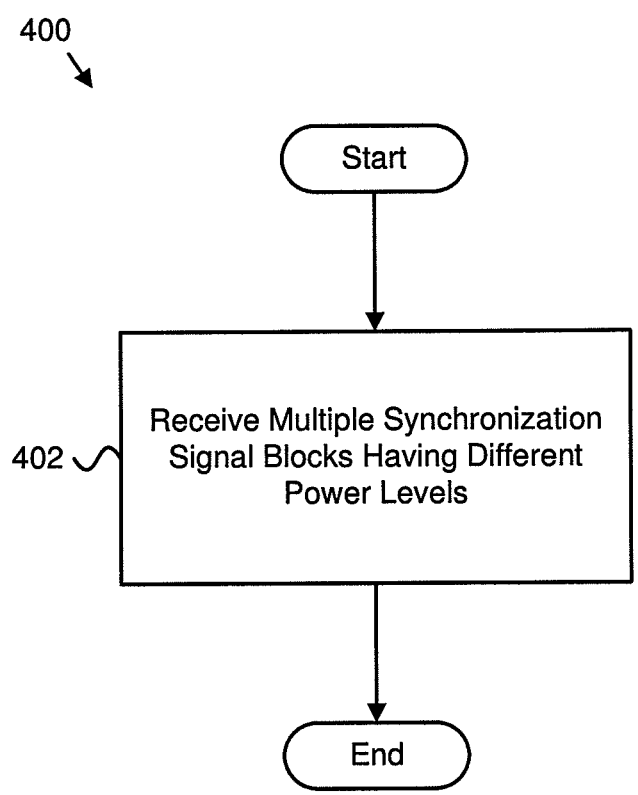
FIG. 4 is a schematic flow chart diagram illustrating one embodiment of a method for synchronization signal block reception.

FIG. 4 is a schematic flow chart diagram illustrating one embodiment of a method 400 for synchronization signal block reception. In some embodiments, the method 400 is performed by an apparatus, such as the remote unit 102. In certain embodiments, the method 400 may be performed by a processor executing program code, for example, a microcontroller, a microprocessor, a CPU, a GPU, an auxiliary processing unit, a FPGA, or the like.

The method 400 may include receiving 402 multiple synchronization signal blocks having different power levels.

In one embodiment, the method 400 includes receiving power information corresponding to the power levels of the multiple synchronization signal blocks in radio resource control signaling. In a further embodiment, the method 400 includes determining a normalized reference signal received power corresponding to each synchronization signal block of the multiple synchronization signal blocks using the power information. In certain embodiments, method 400 includes comparing the normalized reference signal received power corresponding to each synchronization signal block of the multiple synchronization signal blocks. In various embodiments, the method 400 includes transmitting feedback corresponding to the comparison of the normalized reference signal received power corresponding to each synchronization signal block of the multiple synchronization signal blocks. In some embodiments, the method 400 includes receiving nominal power information corresponding to the power levels of the multiple synchronization signal blocks in system information blocks.

In certain embodiments, the method 400 includes receiving power offset information corresponding to the power levels of the multiple synchronization signal blocks in system information blocks, radio resource control signaling, or some combination thereof. In some embodiments, the method 400 includes receiving power information corresponding to channel state information reference signals in radio resource control signaling. In various embodiments, the power information includes nominal power information, power offset information, or some combination thereof.

In one embodiment, the method 400 includes determining a normalized reference signal received power corresponding to channel state information reference signals using the power information. In certain embodiments, the method 400 includes receiving channel state information reference signal ports within a channel state information reference signal resource at a same transmission power level. In some embodiments, the method 400 includes receiving different channel state information reference signal resources at different transmission power levels. In various embodiments, the method 400 includes receiving power information corresponding to channel state information reference signal resources in radio resource control signaling. In one embodiment, the power information includes nominal power information, power offset information, or some combination thereof.

Figure 5:
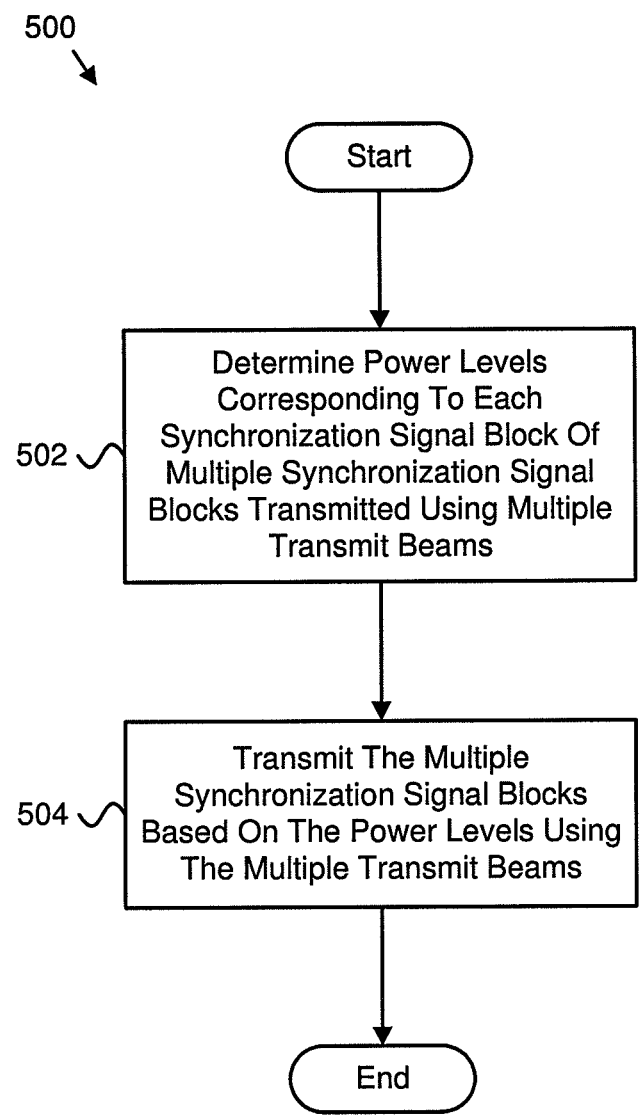
FIG. 5 is a schematic flow chart diagram illustrating one embodiment of a method for synchronization signal block transmission.

FIG. 5 is a schematic flow chart diagram illustrating one embodiment of a method 500 for synchronization signal block transmission. In some embodiments, the method 500 is performed by an apparatus, such as the base unit 104. In certain embodiments, the method 500 may be performed by a processor executing program code, for example, a microcontroller, a microprocessor, a CPU, a GPU, an auxiliary processing unit, a FPGA, or the like.

The method 500 may include determining 502 power levels corresponding to each synchronization signal block of multiple synchronization signal blocks transmitted using multiple transmit beams. In some embodiments, the method 500 includes transmitting 504 the multiple synchronization signal blocks based on the power levels using the multiple transmit beams.

In certain embodiments, the method 500 may include transmitting power information corresponding to the power levels of the multiple synchronization signal blocks in radio resource control signaling. In various embodiments, the method 500 may include transmitting nominal power information corresponding to the power levels of the multiple synchronization signal blocks in system information blocks. In some embodiments, the method 500 may include transmitting power offset information corresponding to the power levels of the multiple synchronization signal blocks in system information blocks, radio resource control signaling, or some combination thereof.

In certain embodiments, the method 500 may include transmitting power information corresponding to channel state information reference signals in radio resource control signaling. In some embodiments, the power information includes nominal power information, power offset information, or some combination thereof. In various embodiments, the method 500 may include transmitting channel state information reference signal ports within a channel state information reference signal resource at a same transmission power level. In one embodiment, the method 500 may include transmitting different channel state information reference signal resources at different transmission power levels. In certain embodiments, the method 500 may include transmitting power information corresponding to channel state information reference signal resources in radio resource control signaling. In various embodiments, the power information includes nominal power information, power offset information, or some combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a receiver that is configured to:
      receive a plurality of synchronization signal blocks having different power levels, wherein each synchronization signal block of the plurality of synchronization signal blocks is configured to be received on a different transmit beam at the different power levels; and
      receive power information corresponding to the power levels of the plurality of synchronization signal blocks; and
   a processor that determines a normalized reference signal received power corresponding to each synchronization signal block of the plurality of synchronization signal blocks using the power information.

2. The apparatus of claim 1, wherein the receiver receives the power information corresponding to the power levels of the plurality of synchronization signal blocks in radio resource control signaling.

3. The apparatus of claim 1, wherein the processor compares the normalized reference signal received power corresponding to each synchronization signal block of the plurality of synchronization signal blocks.

4. The apparatus of claim 3, further comprising a transmitter that transmits feedback corresponding to the comparison of the normalized reference signal received power corresponding to each synchronization signal block of the plurality of synchronization signal blocks.

5. The apparatus of claim 1, wherein the receiver receives nominal power information corresponding to the power levels of the plurality of synchronization signal blocks in system information blocks.

6. The apparatus of claim 5, wherein the receiver receives power offset information corresponding to the power levels of the plurality of synchronization signal blocks in system information blocks, radio resource control signaling, or some combination thereof.

7. The apparatus of claim 1, wherein the receiver receives power information corresponding to channel state information reference signals in radio resource control signaling.

8. The apparatus of claim 7, wherein the power information comprises nominal power information, power offset information, or some combination thereof.

9. The apparatus of claim 7, further comprising a processor that determines a normalized reference signal received power corresponding to channel state information reference signals using the power information.

10. The apparatus of claim 1, wherein the receiver receives channel state information reference signal ports within a channel state information reference signal resource at a same transmission power level.

11. The apparatus of claim 1, wherein the receiver receives different channel state information reference signal resources at different transmission power levels.

12. The apparatus of claim 1, wherein the receiver receives power information corresponding to channel state information reference signal resources in radio resource control signaling.

13. The apparatus of claim 12, wherein the power information comprises nominal power information, power offset information, or some combination thereof.

14. A method comprising:
receiving, at a user equipment, a plurality of synchronization signal blocks having different power levels, wherein each synchronization signal block of the plurality of synchronization signal blocks is configured to be received on a different transmit beam at the different power levels;
receiving power information corresponding to the power levels of the plurality of synchronization signal blocks; and
determining a normalized reference signal received power corresponding to each synchronization signal block of the plurality of synchronization signal blocks using the power information.

15. An apparatus comprising:
a processor configured to determine power levels corresponding to each synchronization signal block of a plurality of synchronization signal blocks transmitted using a plurality of transmit beams; and
a transmitter configured to:
transmit the plurality of synchronization signal blocks based on the power levels using the plurality of transmit beams, wherein each transmit beam of the plurality of transmit beams transmits a respective synchronization signal block of the plurality of synchronization signal blocks at the power levels; and
transmit power information corresponding to the power levels of the plurality of synchronization signal blocks, wherein a normalized reference signal received power corresponding to each synchronization signal block of the plurality of synchronization signal blocks is determined using the power information.

16. The apparatus of claim 15, wherein the transmitter transmits the power information corresponding to the power levels of the plurality of synchronization signal blocks in radio resource control signaling.

17. The apparatus of claim 15, wherein the transmitter transmits power information corresponding to channel state information reference signals in radio resource control signaling.

18. The apparatus of claim 15, wherein the transmitter transmits different channel state information reference signal resources at different transmission power levels.

19. The apparatus of claim 15, wherein the transmitter transmits power information corresponding to channel state information reference signal resources in radio resource control signaling.

* * * * *